(12) United States Patent
Fratila

(10) Patent No.: US 12,290,178 B2
(45) Date of Patent: May 6, 2025

(54) ROCKING LEGS FOR A BED

(71) Applicant: ADIVA WELLNESS SRL, Sibiu (RO)

(72) Inventor: Adrian Fratila, Sibiu (RO)

(73) Assignee: ADIVA WELLNESS SRL (RO)

( * ) Notice: Subject to any disclaimer, the term of this patent is extended or adjusted under 35 U.S.C. 154(b) by 480 days.

(21) Appl. No.: 17/851,974

(22) Filed: Jun. 28, 2022

(65) Prior Publication Data

US 2023/0053418 A1    Feb. 23, 2023

(30) Foreign Application Priority Data

Aug. 18, 2021    (GB) .................................... 2111833

(51) Int. Cl.
*A47C 21/00*        (2006.01)
*H02K 41/025*       (2006.01)

(52) U.S. Cl.
CPC .......... *A47C 21/006* (2013.01); *H02K 41/025* (2013.01)

(58) Field of Classification Search
CPC ..... A47C 21/006; A47C 19/024; A47C 17/00; A47C 17/86; A47C 19/22; H02K 41/025; A47D 9/04
USPC ............................................................. 5/109
See application file for complete search history.

(56) References Cited

U.S. PATENT DOCUMENTS

| | | | | |
|---|---|---|---|---|
| 2,888,086 A | * | 5/1959 | O'Brien | B62B 9/22 104/302 |
| 3,934,283 A | * | 1/1976 | Raffel | A61M 21/00 24/564 |
| 4,546,301 A | * | 10/1985 | Tinebor | H02J 3/1892 318/729 |
| 4,713,745 A | * | 12/1987 | Schauder | H02M 5/271 363/161 |
| 4,793,010 A | * | 12/1988 | Gross | A47D 9/057 5/904 |
| 5,668,421 A | * | 9/1997 | Gladish | F16C 29/025 310/12.21 |
| 5,880,416 A | * | 3/1999 | Colby | B66B 1/285 187/293 |

(Continued)

FOREIGN PATENT DOCUMENTS

| CN | 2087461 | 10/1991 | ............... A47D 9/02 |
|---|---|---|---|
| CN | 2500180 | 7/2012 | ............... A47C 3/02 |

(Continued)

OTHER PUBLICATIONS

International Search Report and Written Opinion issued in PCT/EP2017/078014, dated Jan. 19, 2018, 14 pgs.

(Continued)

*Primary Examiner* — Justin C Mikowski
*Assistant Examiner* — Luke Hall
(74) *Attorney, Agent, or Firm* — HAYES SOLOWAY P.C.

(57) ABSTRACT

A motion imparting leg for imparting an oscillating or reciprocating rectilinear motion to a rocking bed, comprising a base, an upper surface movable relative to the base for imparting the oscillating or reciprocating motion to the rocking bed, a servo motor for driving movement of the upper surface, a position sensor for determining the rotational position of the servo motor or the position of the upper surface, and a motor controller for controlling the servo motor based on data from the position sensing means.

21 Claims, 5 Drawing Sheets

(56) References Cited

U.S. PATENT DOCUMENTS

| | | | | |
|---|---|---|---|---|
| 5,923,144 | A * | 7/1999 | Seibel | H02P 21/18 318/808 |
| 6,068,566 | A | 5/2000 | Kim | F16H 7/00 |
| 6,217,214 | B1 * | 4/2001 | Cabral | A61B 6/505 378/208 |
| 8,239,984 | B2 * | 8/2012 | Hopke | A47D 13/105 5/108 |
| 8,856,982 | B1 * | 10/2014 | Kalivas | A47C 19/021 5/103 |
| 2007/0094792 | A1 * | 5/2007 | Sims, Jr. | A47C 21/006 5/109 |
| 2012/0249036 | A1 * | 10/2012 | Iesaki | H02P 1/16 318/430 |
| 2015/0250329 | A1 | 9/2015 | Murray | A47D 9/02 |
| 2016/0090189 | A1 * | 3/2016 | Wangemann | H02P 25/184 60/698 |
| 2016/0303344 | A1 | 10/2016 | Smudde | A61M 21/02 |
| 2016/0329837 | A1 * | 11/2016 | Kataoka | A61B 5/0263 |
| 2018/0266068 | A1 * | 9/2018 | Rines | E02B 7/50 |
| 2019/0238075 | A1 * | 8/2019 | Shimizu | H02P 6/24 |
| 2019/0290011 | A1 * | 9/2019 | Fratila | A47C 21/006 |
| 2020/0008763 | A1 * | 1/2020 | Nebosis | A61B 6/025 |
| 2020/0138200 | A1 * | 5/2020 | Sharma | A47C 21/044 |
| 2021/0354566 | A1 * | 11/2021 | Ben-Ari | B60T 1/10 |
| 2023/0189982 | A1 * | 6/2023 | Rubio | A47B 9/12 5/11 |

FOREIGN PATENT DOCUMENTS

| | | | | |
|---|---|---|---|---|
| CN | 204378607 | 6/2015 | ............... | A47D 9/02 |
| CN | 110062591 | 3/2022 | ............... | A47C 21/00 |
| DE | 29710002 | 10/1997 | ............... | B62B 9/22 |
| DE | 19841592 | 3/2000 | ............... | B62B 9/22 |
| DE | 20112953 | 11/2001 | ............... | B62B 9/22 |
| EP | 0420065 | 4/1991 | ............... | A61G 11/00 |
| EP | 1900311 | 3/2008 | ............... | A47D 9/04 |
| EP | 3318162 | 5/2018 | ............... | A47C 21/00 |
| EP | 3534755 | 9/2019 | ............... | A47C 21/00 |
| ES | 2383364 | 6/2012 | ............... | A47D 9/02 |
| FR | 2649872 | 1/1991 | ............... | A47D 9/02 |
| FR | 1103398 | 11/1995 | | |
| TW | M360624 | 7/2009 | ............... | A47C 17/04 |
| WO | WO2005/084497 | 9/2005 | ............... | A47D 9/00 |
| WO | WO2018/083153 | 5/2018 | ............... | A47C 21/00 |

OTHER PUBLICATIONS

International Preliminary Report on Patentability issued in PCT/EP2017/078014, dated Mar. 18, 2019, 24 pgs.

Partial European Search Report issued in EP16197183, dated Mar. 21, 2017, 3 pgs.

European Search Report issued in EP16197183, dated May 29, 2017, 10 pgs.

Chinese Office Action issued in CN201780064665.0, dated Jan. 22, 2021, 25 pgs.

Chinese Office Action issued in CN201780064665.0, dated Oct. 12, 2021, 12 pgs.

* cited by examiner

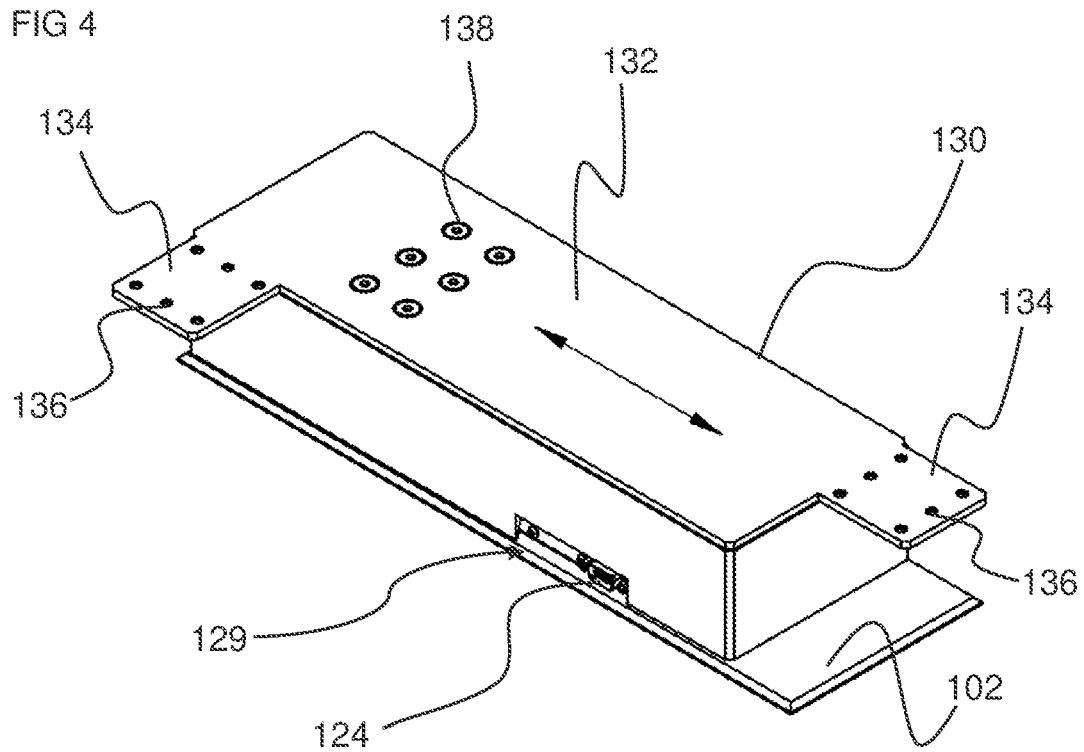
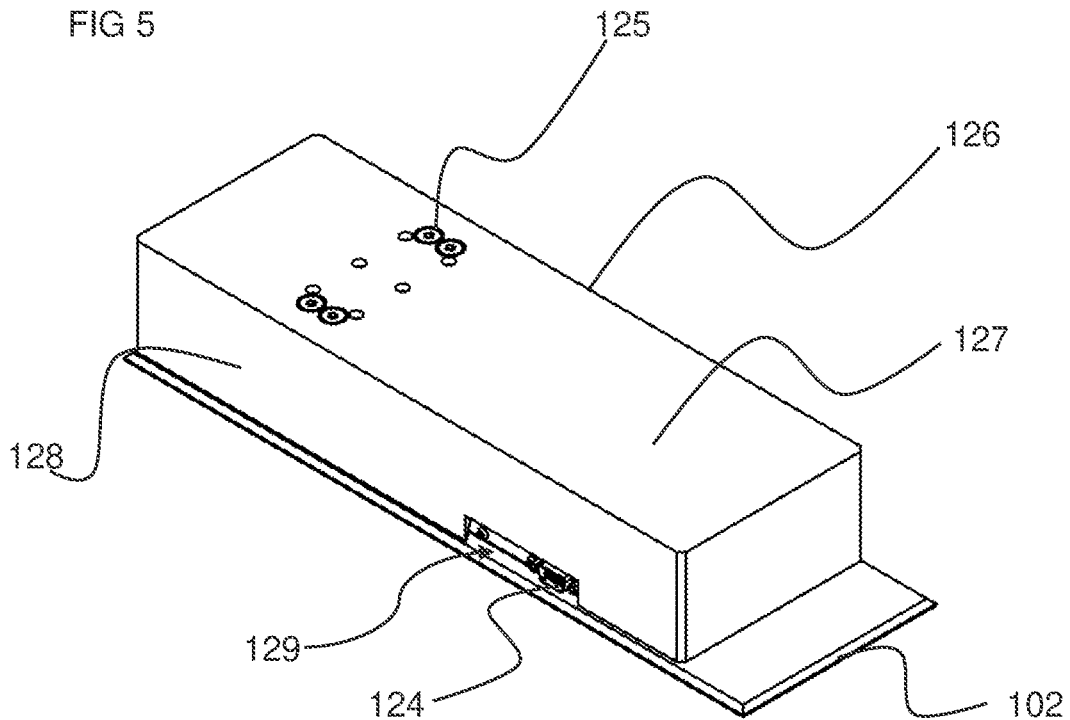

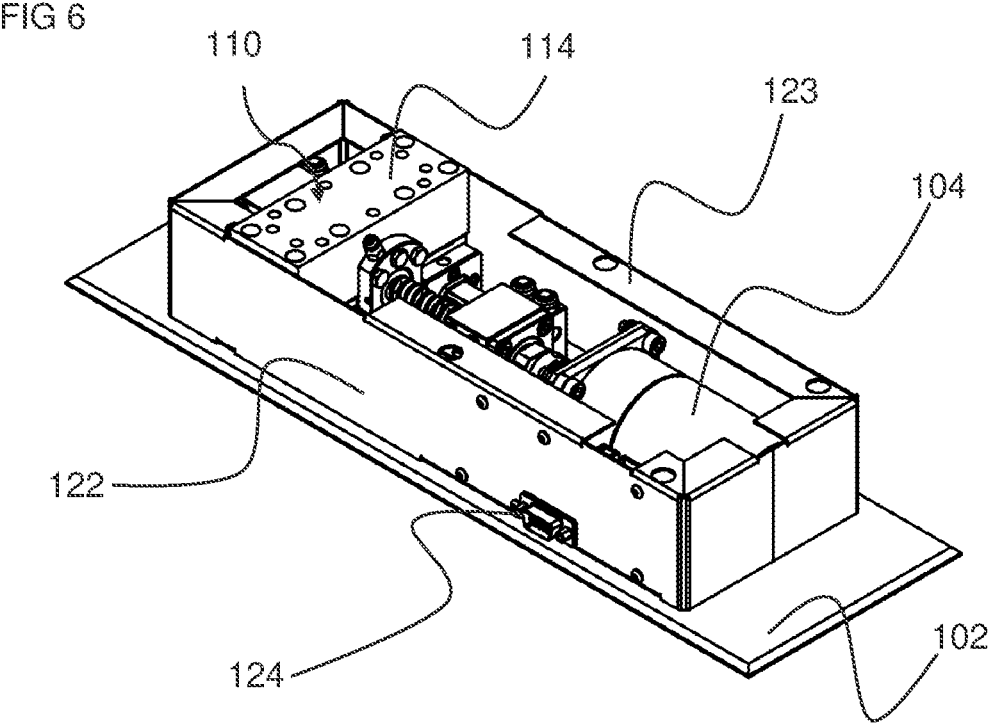
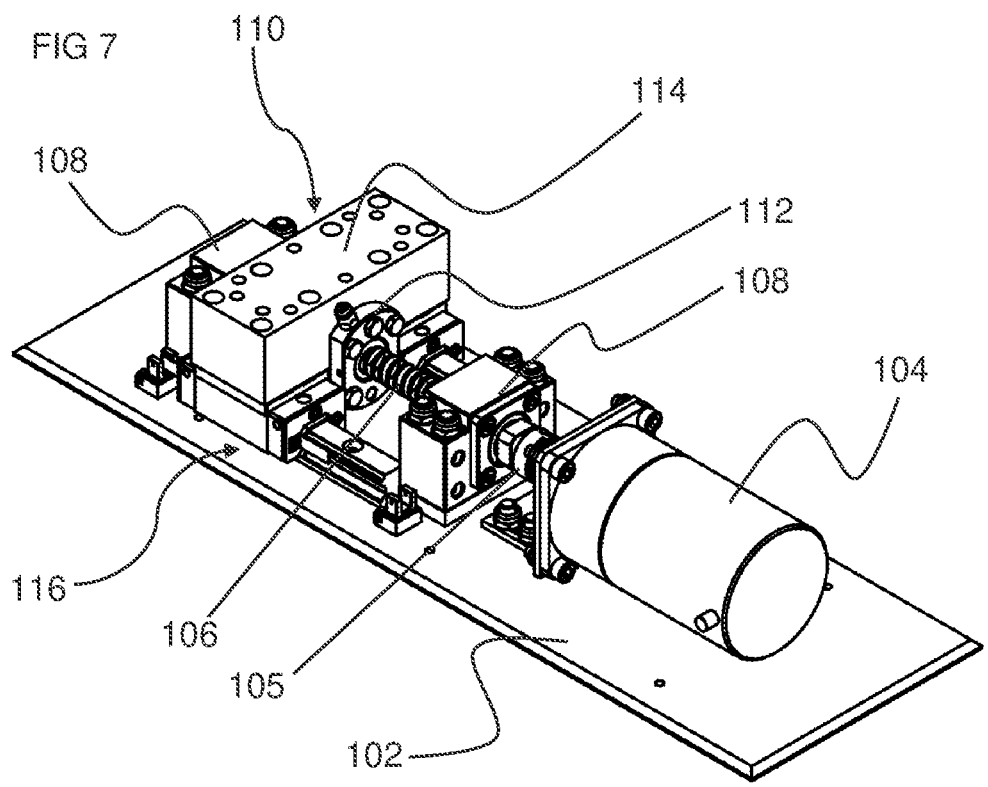

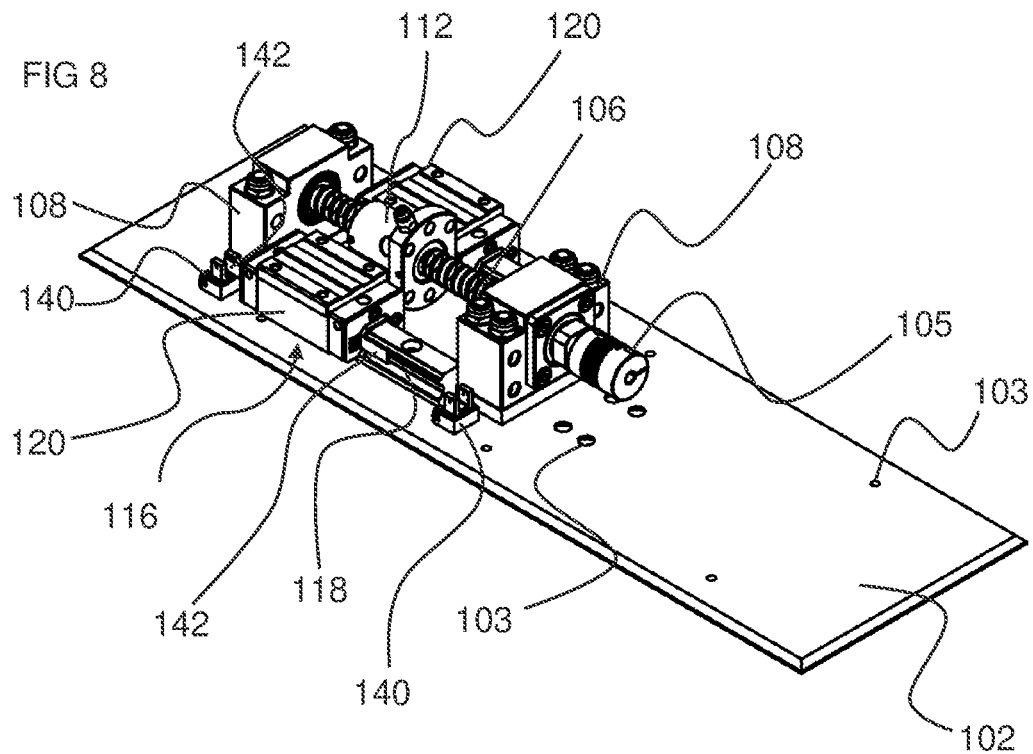
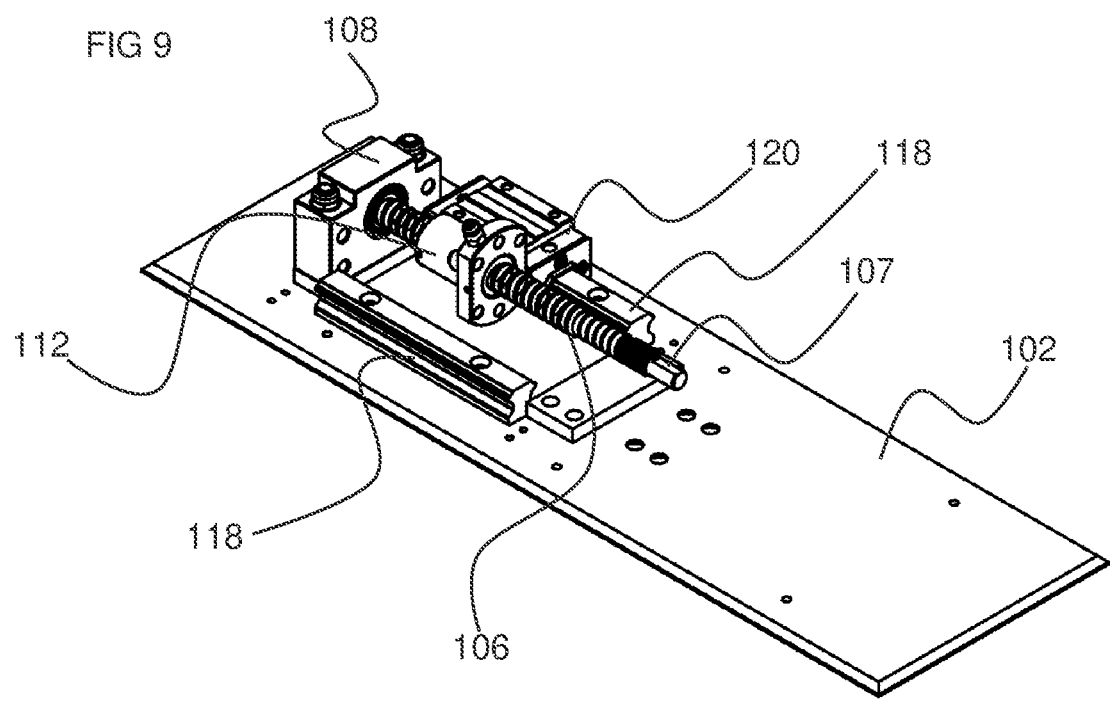

ROCKING LEGS FOR A BED

CROSS REFERENCE TO RELATED APPLICATION

This application claims benefit of UK Patent Application No. 2111833.6 entitled, "Improved Rocking Legs for a Bed" filed Aug. 18, 2021, the entire disclosure of which is incorporated herein by reference.

FIELD OF THE DISCLOSURE

The present disclosure relates to improved rocking legs for a bed and particularly to improved rocking legs which impart an oscillatory or reciprocal movement in a horizontal plane.

BACKGROUND TO THE DISCLOSURE

It is known to provide one or more powered rocking legs or sliders, which can oscillate back and fore, and can be placed underneath the legs of a conventional bed, for example, for imparting a rocking movement.

An example of this arrangement is disclosed in International published patent application WO 2018/083153 A1. In the disclosed arrangement, there are at least two motion imparting legs connected to a bed to impart reciprocating motion. Each motion imparting leg comprises an electric motor used to drive a moving block on sliding bars which is connected to the bed through a bracket or similar. The moving block is suspended above the electric motor with both being connected through either a worm gear reducer or timing pulley gear reducer, the reducers being used to reduce the speed of the motor while increasing torque.

The arrangements disclosed in WO 2018/083153 can be complicated to manufacture because of the mechanical complexity. This also means that maintenance may be needed to ensure that the product performs optimally. The moving block being suspended over the motor provides a tall leg which can be useful for certain bed types but may not be desirable for all, especially those which are normally lower to the floor or are particularly heavy.

The mechanical reducers add sources of noise and vibration, especially if not maintained correctly, which may mean that the rocking bed user is unable to fall asleep or will have their sleep disturbed.

It is an object of the present disclosure to reduce or substantially obviate the aforementioned problems.

SUMMARY OF THE DISCLOSURE

According to an aspect of the present disclosure there is provided a motion imparting leg for imparting an oscillating or reciprocating rectilinear motion to a rocking bed, the leg comprising a base, an upper surface spaced from the base and rectilinearly movable relative to the base for imparting the oscillating or reciprocating motion to the rocking bed, a servo motor for driving movement of the upper surface, a position sensing means or sensor for determining the rotational position of the servo motor or the position of the upper surface, and a motor controller for controlling the servo motor based on data from the position sensing means.

The use of a servo motor controlled through a position sensing means is highly advantageous because it can operate at low speeds with high torque with reduced audible noise and vibration. It also has the added advantages of reducing maintenance requirements and increasing reliability because there are no worm gear or pulley reducers. The motion inducing legs may be considered rocking legs or rocker legs.

Rectilinear motion may be considered translational motion back and fore in a horizontal plane.

The servo motor may be a brushless motor. The servo motor may be a brushed motor.

The position sensing means may include a rotary encoder disposed to the rotor or shaft of the servo motor. The rotary encoder may be an optical or magnetic encoder.

The rotary encoder advantageously provides precise positioning for the low speed and high torque application of the electric motor.

The position sensing means may include a linear encoder for encoding the position of the upper surface.

The provision of a linear encoder, either individually or in combination with other means such as the rotary encoder, provides precise positioning for the low speed and high torque application. It has the added advantage of improving synchronicity between multiple motion imparting legs. A further advantage, when in combination with the rotary encoder, is that it can be used as part of a safety system to determine a discrepancy between rotation of the motor and movement of the upper surface.

A rectilinear motion assembly may be provided for converting the rotation of the motor shaft to linear movement of the upper surface.

The rectilinear motion assembly may comprise a threaded rod, such as a leadscrew rod, rotationally coupled to the shaft of the servo motor. The threaded rod may be coupled to the upper surface. The end of the threaded rod may be coupled to the end of motor shaft.

Rotationally coupling the threaded rod to the shaft of the servo motor, especially when coupling the ends, reduces the height of the motion imparting leg. This also has the advantage of reducing or removing the need for gearing or pulleys which reduces noise and vibration while improving reliability.

The end of the threaded rod may be aligned with the end of the shaft of the servo motor. The threaded rod may be aligned on substantially the same axis as the shaft of the servo motor. That is to say that the threaded rod and shaft of the servo motor may be concentric.

The height of the motion imparting leg is reduced by aligning the end of the threaded rod and motor shaft so that they are disposed on substantially the same axis, i.e., concentric.

A flexible shaft coupling may be provided. The flexible coupling may couple an end of the threaded rod to an end of the servo motor shaft.

The flexible couple may provide a means to address angular misalignment, eccentricity, and or axial misalignment.

The flexible shaft coupling allows for a deviation in the alignment between the threaded rod and motor shaft which reduces the manufacturing burden as perfect alignment is not needed. It has the added advantage of improving reliability as the alignment between rod and shaft may drift over time.

The rectilinear motion assembly may comprise a movable carriage. The movable carriage may be movably disposed on the threaded rod. The movable carriage may be coupled to the upper surface. Alternatively, the upper surface may be provided in the movable carriage. The movable carriage may comprise a threaded aperture in which the threaded rod is received.

The movable carriage may comprise a linear slider assembly. The linear slider assembly may be disposed parallel to the threaded rod. The linear slider assembly may comprise a first slider element coupled to the movable carriage and a second slider element disposed to the base. The second slider element being a guide rail and the first slider element being a movable block which is received on the guide rail.

The linear slider assembly supports the movable carriage as well as ensuring that the weight from the bed is transferred to the base of the motion imparting leg. This allows the motion imparting leg to support heavier beds, as each leg can support more weight.

The linear slider assembly may also be called a linear bearing assembly.

The linear encoder may be disposed to a component of the motion imparting leg which undergoes rectilinear movement. The linear encoder may be disposed to the linear slider assembly. The linear encoder may be disposed to the movable carriage. The linear encoder may be disposed to the upper surface. The advantage of disposing the linear encoder to a component which moves rectilinearly has been covered further above.

The motor controller may be configured to use variable-frequency drive control. The motor controller may be configured to use field-oriented control, also known as vector control.

The motor controller may use the data from the position sensing means to determine the position of the motor. The motor controller may control the motor based on a comparison between the determined position of the motor and a desired motion or position path. The desired motion or position path may be received from a central control hub.

The motor controller may store positional data in a persistent memory, such as FLASH or EEPROM, when the motor stop rotating, for example during normal shutdown. The positional data may be indicative of the position of the rotatory encoder. The positional data may be indicative of the position of the linear encoder. The motor controller, upon start up, may retrieve the positional data stored in the persistent memory.

Storing this data in the persistent memory means that there is no need to determine the ends of the upper surface motion path, that is to say there is no need to recalibrate the position of the upper surface of the extent or length) of the motion path.

An additional benefit is that the positional data for the rotary encoder is needed in some embodiments to derive the motor phase currents.

In the event that the positional data from the rotary encoder is unknown, the motor controller may be configured to inject current through the motor stator windings in an iterative process to determine the relative motor rotor position, against the motor stator windings.

By following the iterative process, it is possible to determine the instantaneous rotor stator relative position, i.e., the initial rotor position at startup relative to the stator, without positional data from the position sensing means such as the rotary encoder. This ensures that the electric motor may operate from start up because the electrical currents injected into the motor windings during normal operation use phases that are derived from the instantaneous rotor stator relative position.

The motor controller may comprise a communication device or means, such as a data transmitter, data receiver, or data transceiver for receiving and/or transmitting data to a central control hub or to a same or similar motion imparting leg.

The communication means allows data and information to shared. This allows the motion between multiple motion imparting legs to be synchronised.

The communication means may include a wired communication means. The communication means may include a wireless communication means.

The base and upper surface are substantially parallel. The upper surface may be spaced from the base.

A bed mounting bracket may be provided. The bed mounting bracket may be removably coupled to the upper surface. The bed mounting bracket may couple the motion imparting leg to a bed frame or bed leg of the rocking bed.

A bed coupling means may be provided in the bed mounting bracket. The bed coupling means may provide a coupling means used to couple to standard bed frame or beg legs, for example, screw apertures may be provided for coupling to a solid wooden bed frame or leg. In other examples, clamps, grips or similar, may be provided for coupling to a metal bed frame or leg, especially hollow bed frames or legs.

A movable shroud may be provided. The movable shroud may substantially surround at least some of the components of the motion imparting leg. The upper surface may be provided in the movable shroud, that is the say the upper surface may be a face of the movable shroud.

A safety system may be provided. The safety system may be configured to monitor for unexpected operation of the motion imparting leg. The safety system may be configured to generate a warning signal based on the motion imparting leg operating unexpectedly. The warning signal may be transmitted to a central control hub. The safety system may be provided in the motion imparting leg. The motor controller may comprise the safety system.

The safety system may be configured to monitor for a decoupling between the motion of the electric motor and upper surface. The safety system may be configured to generate a decoupling warning signal as a result of determining a decoupling between the motion of the electric motor and upper surface. The decoupling warning signal may be used to shut down the motion imparting leg.

Decoupling may be indicated by a difference between the expected position of the upper surface and the actual position of the upper surface. This may be as a result of a complete decoupling where there is no rectilinear motion despite rotation of the motor or a partial decoupling where there is some rectilinear motion but not as much as expected.

The decoupling determination may be based on data from the position sensing means. The decoupling determination may be based on data from the rotary encoder and/or the linear encoder. The decoupling determination may be based on a monitored motor current and data from the rotary encoder.

The safety system may be configured to monitor for excessive rectilinear motion. That is to say the safety system may be configured to monitor for rectilinear motion outside of a motion path length. The safety system may be configured to generate an excessive rectilinear motion warning signal as a result of determining excessive rectilinear motion of the upper surface or other rectilinearly moving component(s). The excessive rectilinear motion warning signal may be used to shut down the motion imparting leg.

The excessive rectilinear motion determination may be based on data from sensors.

The excessive rectilinear motion determination may be based on switches.

The safety system may comprise at least two switches for determining excessive rectilinear motion. The switches preferably being optical switches.

Each switch corresponds with a trigger means, such as a flange, blade or similar, for actuating the switch. Preferably, the trigger means may be configured to interrupt a light path of the optical switch.

Each switch may be disposed toward an end of a motion path of a rectilinearly moving component, such as the upper surface, movable carriage, slider assembly etc. Each optical switch may be disposed proximate an end of the second slider element. In such embodiments, the switches may be considered stationary switches because they are in a fixed position relative to the rectilinearly moving component.

Each trigger means may be disposed on a rectilinearly moving component, such as the upper surface, movable carriage, slider assembly etc. Preferably, a blade or flange extends from each end of the first slider element. In embodiments with a stationary switch, the trigger means may be considered a movable trigger means because it moves with a rectilinearly moving component.

In other embodiments, each switch may be disposed on a rectilinearly moving component, such as the upper surface, movable carriage, slider assembly etc. Preferably, each optical switch may be disposed to an end of the first slider element. In such embodiments the switches may be considered movable switches because they move with a rectilinearly moving component.

In embodiments with movable switches, each trigger means may be disposed toward an end of a motion path of the rectilinearly moving component. Preferably, a blade or flange is disposed proximate each end of the second slider element and extends into the path of the movable switch. In such embodiments, the trigger means may be considered a stationary trigger means because they are in a fixed position relative to a moving component.

At least one of the switches may be disposed to the same side as the motor controller. That is to say that at least one switch may be proximate the motor controller. This reduces the length of connection wires.

Preferably, the components moving rectilinearly (such as the upper surface, the slider assembly, the movable carriage etc) are restrained to move between two predetermined points during normal operation. Excessive rectilinear motion may be considered to occur when the components moving rectilinearly move past the predetermined points. The predetermined points being set before the motion imparting legs are supplied to a user.

The switches may be positioned so that they are only actuated once the component moves past the predetermined points. That is to say the switches are not actuated during normal operation of the motion imparting leg.

Being able to monitor for excessive rectilinear motion ensures that if an upper surface was to move out of the motion path it can be stopped and later synchronised with other legs in a system. A safety system is beneficial as it may detect problems early which prevents the device from being further damaged.

An emergency power supply system may be provided. The emergency power supply system may be configured to supply power to the motion imparting leg if there is a loss of power supplied by a main connection or central control hub. The emergency power supply system may supply power for a short temporary period, the short temporary period being sufficient for the motor controller to store positional data, and/or other data, in a persistent memory.

The emergency power supply may include an energy store, such as a capacitor or battery.

The energy store may be provided in the motion imparting leg and/or the central control hub. The emergency power supply system may include circuitry provided in the motor controller. The emergency power supply system may include circuitry provided in the central control hub.

The emergency power supply advantageously provides sufficient power for relevant data to be stored in a memory if there is a loss of power. The relevant data may be positional data such as the position of the motor and/or the position of the upper surface or another component which is indicative of the upper surface position. This ensures that the motion imparting leg will have accurate positional information when operational power is supplied.

Another aspect of the present disclosure may be provided by a motion imparting system, the system comprising a plurality of motion imparting legs. The motion imparting legs may be according to any other aspects of the present disclosure.

The system may comprise a central control hub. The central control hub may be connectable to each motion imparting leg. The central control hub may include a communication means. The communication means may be wired and/or wireless. The central control hub may synchronise the rectilinear motion of the motion imparting legs. The central control hub may supply power to each motion imparting leg, in such cases it could be a central control and power hub.

The central control hub may generate a desired motion or position path which is communicated to each motion imparting leg.

Where each motion imparting leg comprises a safety system, the central control hub may generate a shutdown signal upon receipt of a warning signal from at least one motion imparting leg. The shutdown signal may be communicated to each motion imparting leg.

Another aspect of the present disclosure is provided by a kit of parts for retrofitting to a bed, the kit of parts comprising a plurality of motion imparting legs. The motion imparting legs may be according to any other aspect of the present disclosure.

It is possible to convert an existing bed into a rocking bed by retrofitting a plurality of motion imparting legs using the kit of parts.

A central control hub connectable to each motion imparting leg may be provided in the kit of parts. The central control hub may comprise the same features as set out above.

In another aspect of the present disclosure there is provided a rocking bed, the rocking bed comprising a plurality of motion imparting legs fixedly attached to a bed frame.

The motion imparting legs may be according to any other aspect of the present disclosure.

A prefabricated rocking bed with motion imparting legs removes the complexity of retrofitting the motion imparting legs to an existing bed.

In another aspect of the present disclosure there is provided a motion imparting leg for imparting an oscillating or reciprocating rocking motion in a horizontal plane to a rocking bed, comprising a base and an upper surface movable relative to the base, the movement being driven by a servo motor controlled by a position encoder attached to the rotor of the motor.

In another aspect of the present disclosure there is provided a method of calibrating a motion imparting leg, the motion imparting leg comprising an upper surface movable relative to a base through a motion path, an electric motor for driving movement of the upper surface through the motion path, a motor controller for controlling the electric motor and a positioning system, the method comprising the steps of operating the electric motor to drive the upper surface through the motion path until the positioning system determines both ends of the motion path, and storing the positional data related to both ends in the motor controller. The motion imparting leg in this method may be the motion imparting leg of any other aspect.

This is advantageous as it determines the position of the upper surface and extent, or length, of the motion path, which is especially useful for newly manufactured motion imparting legs. This method also allows for existing motion imparting legs to be calibrated when needed.

The positioning system may be the safety system described above, preferably the safety system which is configured to monitor for excessive rectilinear motion. The positioning system in this aspect may comprise two optical switches.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 4 to 9 show perspective views of an example motion imparting leg, with parts removed through the Figures to show the internal components.

DETAILED DESCRIPTION

Figure 1:
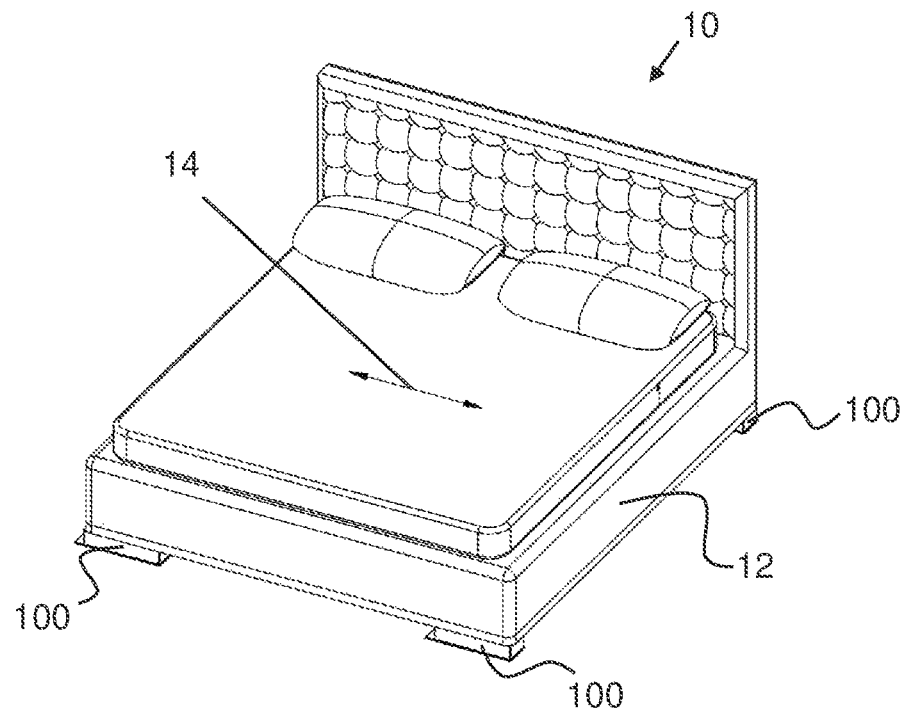
FIG. 1 shows a perspective view of a double bed mounted on motion imparting legs of the disclosure.
Figure 2:
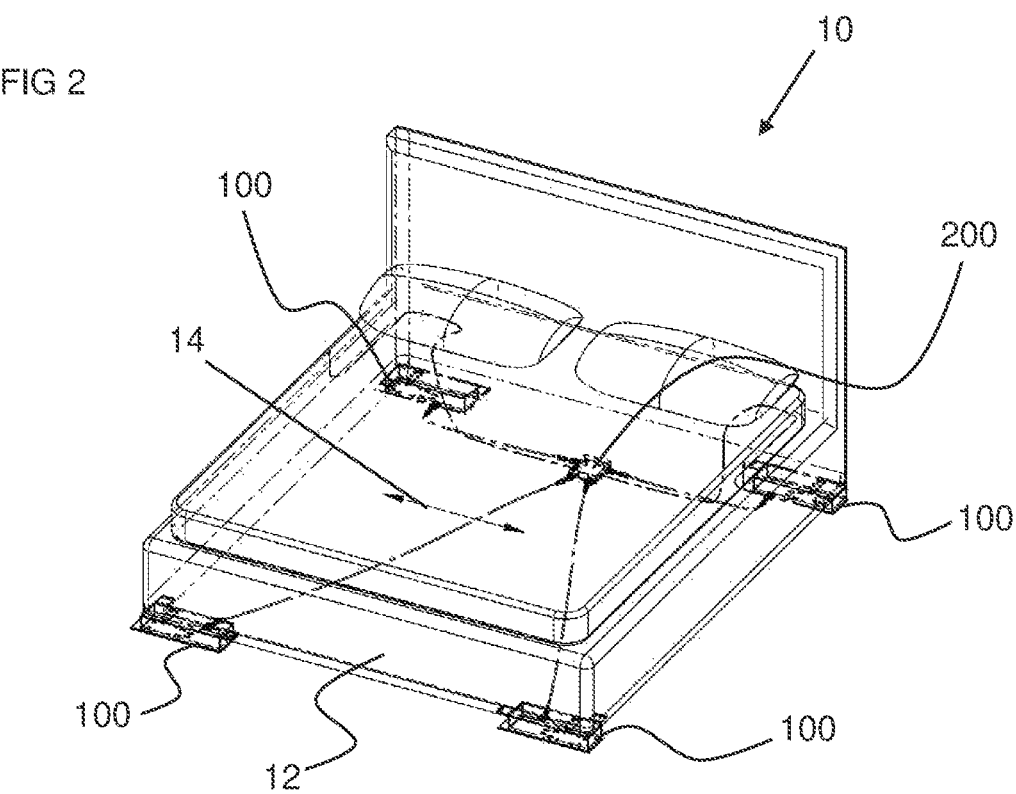
FIG. 2 shows a perspective transparent view of a double bed mounted on the motion imparting legs of FIG. 1.

Referring first to FIGS. 1 and 2, a rocking bed is shown, as generally indicated at 10.

Four motion imparting legs 100 are disposed to the corners of a bed frame 12, with each motion imparting leg being disposed to a corner. Only three of the motion imparting legs 100 are visible in FIG. 1 but can be more easily seen in FIGS. 2 and 3. The motion imparting legs 100 will be discussed in more detail further below.

Each motion imparting leg 100 includes a floor bearing base which, in use, is in contact with the floor and at least one movable component which is coupled to the bed frame.

The rocking bed 10 may be manufactured from retrofitting the motion imparting legs 100 to bed frame 12 of an existing bed or typical bed. This will involve removing the legs which came with the existing bed and affixing a movable component of the motion imparting legs 100 to an underside face of the bed frame 12.

In other embodiments, the rocking bed 10 may be supplied with the motion imparting legs 100 already affixed to the bed frame.

During use an upper surface, preferably the mounting bracket described later, of each of the four motion imparting legs 100 will move back and forth, as shown in the arrows 13 in FIG. 3, with respect to the floor bearing base in an oscillating or reciprocating rectilinear manner. Since the motion imparting legs 100 are connected to the bed frame 12 through the movable upper surface, the rocking bed 10 will oscillate or reciprocate back and forth in a horizontal plane, that is to say it will move rectilinearly, this can be seen by the arrow 14.

Figure 3:
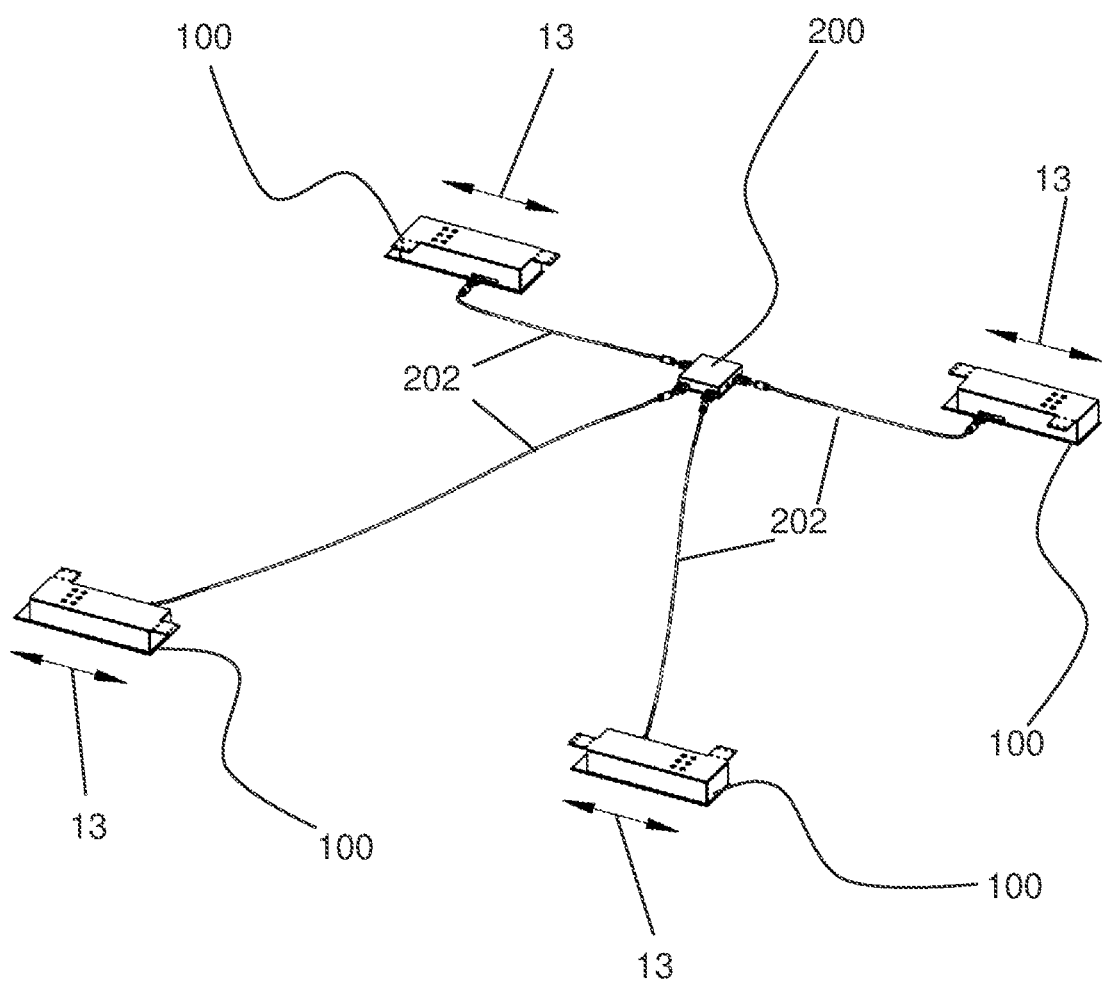
FIG. 3 shows a perspective view of four motion imparting legs forming a set for a bed, connected together by cabling a central hub.

A central hub 200 for controlling and providing power to the motion imparting legs 100 is provided, this can be more easily seen in FIGS. 2 and 3. The central hub 200 is connected to each motion imparting leg 100 by cabling 202. The cabling 202 provides a route for data communication and power.

In the current embodiment, the central hub 200 receives data and/or signals from each motion imparting leg 100. The central hub may send commands, signals, data and/or information to the or each motion imparting leg 100. The central hub 200 may be configured to synchronise the motion of the legs 100.

Referring to FIGS. 4 to 9, a motion imparting leg 100 is shown in more detail.

A base 102 for bearing against the floor is provided. The base 102 is preferably rectangular.

Bores 103 for receiving fixings, such as bolts or screws, extend through the base 102 and provide a means to mount components.

An electric motor 104, preferably a brushless servo motor, is mounted to the base 102 by means of a bracket or similar. A motor shaft extends from a body of the motor partially along the longitudinal length of the base 102. The motor shaft is not visible in the Figures.

A rotary encoder is attached to the motor shaft within the body of the motor. In other embodiments, the rotary encoder may be disposed in other positions.

A motor controller (not shown) is connected to the rotary encoder. The motor controller controls the speed of the motor based on the positional data from the rotary encoder. The motor controller also controls the speed of the motor based on the desired motion or position path received from the control hub 200.

In some embodiments, the motor controller includes a persistent memory for storing data, especially positional data, while the motion imparting leg 100 is powered down. In other embodiments, an emergency power store may be provided so that the motor controller can store the required data in the persistent memory in the event of an unexpected loss of power. The power store may be a small battery or a capacitor which provides sufficient power to store the positional data in a short time frame, for example 1 second.

A flexible shaft coupling 105 is provided for coupling rotation of the motor shaft to a leadscrew rod.

Flexible shaft coupling 105 includes a first end couple with a threaded fastener, a second end couple with a threaded fastener and a flexible central position which allows the first and second end couples to misaligned.

A leadscrew rod 106 with a threaded portion extending at least partially along the longitudinal length of its body is provided. At one end of the leadscrew rod 106 is provided a non-threaded portion and a coupling portion. The coupling portion 107 includes a key with a substantially flat surface for engaging with a threaded fastener. At the other end of the rod is provided a non-threaded portion of the body.

The coupling portion of the leadscrew rod 106 is inserted into the first end couple of the flexible shaft coupling 105. The threaded fastener in the first end couple is tightened and engages with the substantially flat surface of the key.

The end of the motor shaft is inserted into the second end couple and the threaded fastener is tightened to secure the motor shaft, preferably to a key on the motor shaft.

The end of the motor shaft and end of the leadscrew rod are substantially disposed on the same axis, that is to say they are substantially concentric, and spaced apart by the flexible coupling 105.

Leadscrew rod mounting brackets 108 are mounted to the base 102. Each leadscrew mounting bracket 108 includes a through aperture with a bearing disposed therein. The leadscrew rod 106 is located so that the non-threaded portions are disposed to the bearings of the leadscrew rod mounting brackets 108.

A movable carriage 110 is coupled to the leadscrew rod 106. The movable carriage includes a screw nut 112 disposed on the leadscrew rod 106 and a movable block 114 removably coupled to the screw nut 112.

During use, the shaft of the electric motor 104 rotates which causes the leadscrew rod 106 to rotate. As the leadscrew rod 106 rotates the movable carriage moves rectilinearly along the threaded portion of the leadscrew rod.

Two linear slider assemblies 116 are provided on each side of the leadscrew rod 106. Each linear slider assembly 116 has a first element in the form of a shaped guide 118 which is mounted to the base 102 and a second element in the form of a sliding block 120. Each sliding block 120 includes a recess shaped and sized to receive the shaped guide 118. An upper surface of the sliding block 120 includes coupling means for coupling the sliding block to the movable block 114 of the movable carriage 110.

In some embodiment a linear encoder is disposed to at least one linear slider assembly 116. In such embodiments, the linear encoder is connected to the motor controller and is used to determine the linear position of sliding block 120 which is used to infer the position of the movable upper surface coupled to the bed frame.

A wall 122 extends from the surface of the base 102. The wall 122 encircles the motor, leadscrew rod, linear slider assemblies, and various other components. Flanges 123 extend inwards from one edge of the wall 122. Cut-outs are provided in the flanges to allow the movable block 114 to rectilinearly move.

In the current embodiment, a connector port 124 is provided on an outer surface of the wall 122. The connector port 124 is electrically connected to the motor controller and provides a data connection between the central hub 200 and the motion imparting leg 100.

In the current embodiment, the connector port 124 is also used to connect to a power source. In other embodiments a separate power connector port may be provided. In embodiments comprising a wireless communication means, the connector port may be used as a power connector port.

A movable shroud 126 is provided. The movable shroud 126 includes an upper surface 127 which is substantially planer and a wall 128 depending from the peripheral edge of the upper surface 127. A cut-out 129 is provided in the wall 128 so that the movable shroud 126 does not contact the cabling connected to the connector port 124 during the full extent, or length, of rectilinear movement. In the current embodiment, the movable shroud 126 does not extend past the base 102 and remains within the footprint of the base 102 during rectilinear movement.

The movable shroud 126 is connected to the movable block 114 through fasteners 125, such as threaded bolts, which extend through apertures in the upper surface 127.

When the movable shroud 126 is fitted it extends over the wall 122. A bearing, or similar, may be provided between the movable shroud 126 and the flanges of the wall 122.

A bed frame mounting bracket 130 is provided. In the current embodiment, the bed frame mounting bracket 130 is plate-like being substantially planer having an upper surface and a lower surface. In other embodiments, the bed frame mounting bracket 130 may not be plate-like and be constructed to fit different types of bed frames.

In the current embodiment, the bed frame mounting bracket 130 is substantially L-shaped. The mounting bracket 130 has a main body portion 132 and first and second portions 134 which extend from the main body portion. In other embodiments, the mounting bracket may have a different shape. The upper surface of the mounting bracket 130 is in contact with a surface of the bed frame when the motion imparting leg 100 is fitted to the bed frame.

Coupling apertures 136 sized and shaped to received screws, or other types of fasteners, are provided in both the first and second portions 134. The coupling apertures allow the motion imparting leg 100 to be securely fastened to the bed frame by means of fasteners.

A plurality of mounting apertures 138 are provided in the upper surface of the mounting bracket 130. The mounting apertures are sized and shaped to receive a fixing, such as a bolt or other fastener. The mounting apertures allow the bed frame mounting bracket 130 to be coupled to the movable shroud 126 and the movable block 114. The lower surface of the bed frame mounting bracket 130 is in contact with the upper surface 127 of the movable shroud 126.

In some embodiments a safety system is provided with the motor controller. The safety system may be configured to determine unexpected operation of the motion imparting leg. For example, the safety system may be used to determine if there is a decoupling, either complete or partial, between the rectilinear motion of components, such as the mounting bracket 130, and the rotary motion of the motor shaft.

If a decoupling has been determined, the motor controller generates a warning signal which is transmitted to the central hub 200 via the cabling 202. The central control hub 200 may then generate a shutdown signal which is transmitted to all of the motion imparting legs 100.

In some embodiments, the safety system uses data from the rotary encoder and linear encoder to determine if there is a decoupling. In other embodiments, the safety system uses data from one of the encoders plus a monitored electrical value of the motor, such as current.

The safety system may be configured to determine excessive rectilinear motion. That is to say, the safety system may determine that the upper surface, preferably the bracket 132, has moved further than one end of its defined motion path length. The safety system may use the rectilinear motion of other components, such as the sliding block 120, carriage 110 or shroud 126, to infer the motion of the upper surface.

The safety system includes two optical switches 140 connected to the motor controller. Each optical switch 140 is disposed towards an end of the linear slider assembly 116, specifically the shaped guide 118. Each optical switch 140 has a switch gate comprised of two pillars with a light path disposed therebetween.

A blade 142, or similar switch trigger means, is disposed on either end of the sliding block 120. Each blade extends out from the block towards an optical switch 140. The blade 142 actuates the optical switch by interrupting the light path in the switch gate.

During normal operation of the motion imparting leg, the blades 142 will not actuate the optical switches 140.

If the optical switches 140 are actuated, the motor controller generates a warning signal which is transmitted to the central hub 200 via the cabling 202. The central control hub 200 may then generate a shutdown signal which is transmitted to all of the motion imparting legs 100.

The optical switches may also be used in a method of calibrating a motion imparting leg. The method will now be described with reference to the embodiments discussed above, however it is applicable to other types of motion imparting legs.

To calibrate the motion imparting leg 100 and determine the maximum extent of possible rectilinear motion, the motor 104 drives the carriage assembly 110 and sliding blocks 120 until a blade 142 actuates an optical switch 140. The actuation of the optical switch 140 is indicative of the end of the rectilinear motion path. The motor controller records positional data indicative of the end of the motion path.

Once one end has been recorded, the motion imparting leg 100 undergoes the same steps but reverses the direction of the motor 104 to determine the other end of the rectilinear path.

With both ends being recorded the extent of possible rectilinear motion, i.e., the maximum motion path length, is determined and the carriage 110 is moved back towards a central position, i.e., about equal distance between both ends.

In the current embodiment, the optical switches 140 are not to be triggered during normal operation of the motion imparting leg 100. This means that the actual motion path length has to be less than the maximum motion path length so that the blades 142 do not trigger the optical switches 142. In the current embodiment, the actual motion path length will be 4 mm smaller than the maximum motion path length, that is to say there is a margin of 2 mm at either end.

The embodiments described above are provided by way of example only, and various changes and modifications will be apparent to persons skilled in the art without departing from the scope of the present disclosure as defined by the appended claims.

The invention claimed is:

1. A motion imparting leg for imparting an oscillating or reciprocating rectilinear motion to a rocking bed, the motion imparting leg comprising:
 a base;
 a movable block having an upper surface movable relative to the base for imparting oscillating or reciprocating rectilinear motion;
 a servo motor for driving movement of the upper surface;
 a threaded rod coupled between the upper surface and the servo motor, wherein an elongated axis of the threaded rod is substantially aligned collinear with an axis of a servo motor shaft and a direction of the oscillating or reciprocating rectilinear motion of the upper surface;
 a position sensor for determining a rotational position of the servo motor or a position of the upper surface; and
 a motor controller for controlling the servo motor based on data from the position sensor.

2. A motion imparting leg as claimed in claim 1, wherein the position sensor includes a rotary encoder disposed to a rotor or shaft of the servo motor.

3. A motion imparting leg as claimed in claim 1, wherein the position sensor includes a linear encoder for encoding the position of the upper surface.

4. A motion imparting leg as claimed in claim 1, further comprising a rectilinear motion assembly for converting the rotation of the servo motor shaft to rectilinear movement of the upper surface.

5. A motion imparting leg as claimed in claim 1, wherein a flexible coupling is provided to couple an end of the threaded rod to an end of the servo motor shaft.

6. A motion imparting leg as claimed in claim 1, wherein the rectilinear motion assembly comprises a movable carriage disposed to the threaded rod and coupled to the upper surface, wherein rotation of the servo motor shaft rotates the threaded rod causing the movable carriage to move rectilinearly along the threaded rod.

7. A motion imparting leg as claimed in claim 6, wherein the movable carriage comprises a linear slider assembly parallel to the threaded rod.

8. A motion imparting leg as claimed in claim 7, wherein the position sensor includes a linear encoder for encoding the position of the upper surface, and wherein the linear encoder is disposed to the linear slider assembly.

9. A motion imparting leg as claimed in claim 1, wherein the motor controller is configured to use variable-frequency drive control.

10. A motion imparting leg as claimed in claim 9, wherein the motor controller is configured to use field-oriented control.

11. A motion imparting leg as claimed in claim 1, wherein the motor controller comprises a communication device for receiving or sending data to a central control hub or a similar motion imparting leg.

12. A motion imparting leg as claimed in claim 11, wherein the communication device includes a wired communication port.

13. A motion imparting leg as claimed in claim 1, wherein a bed mounting bracket comprises the upper surface.

14. A motion imparting leg as claimed in claim 1, further comprising a movable shroud for substantially surrounding at least some components of the motion imparting leg.

15. A motion imparting leg as claimed in claim 1, further comprising a safety system for monitoring that the motion imparting leg is operating as expected, the safety system generating a warning signal when the motion imparting leg is operating unexpectedly.

16. A motion imparting leg as claimed in claim 15, wherein the safety system is configured to monitor for a decoupling between rotational motion of the servo motor shaft and rectilinear motion of the upper surface.

17. A motion imparting leg as claimed in claim 15, wherein the safety system is configured to monitor for excessive rectilinear motion beyond two predetermined points on a rectilinear path.

18. A motion imparting leg as claimed in claim 17, wherein the safety system includes at least two optical switches for determining excessive rectilinear motion.

19. A motion imparting leg as claimed in claim 1, further comprising an emergency power supply system configured to supply power to the motor controller to store positional data in an event of power loss.

20. A rocking bed retrofitted with a plurality of motion imparting legs as claimed in claim 1, wherein a movable surface of each motion imparting leg is removably coupled to a bed frame or leg of a bed.

21. A rocking bed comprising a bed frame and a plurality of motion imparting legs as claimed in claim 1, the motion imparting legs being attached around a periphery of a bed frame.

* * * * *